(No Model.)
J. H. PITARD.
CAR BRAKE.
No. 282,222. Patented July 31, 1883.
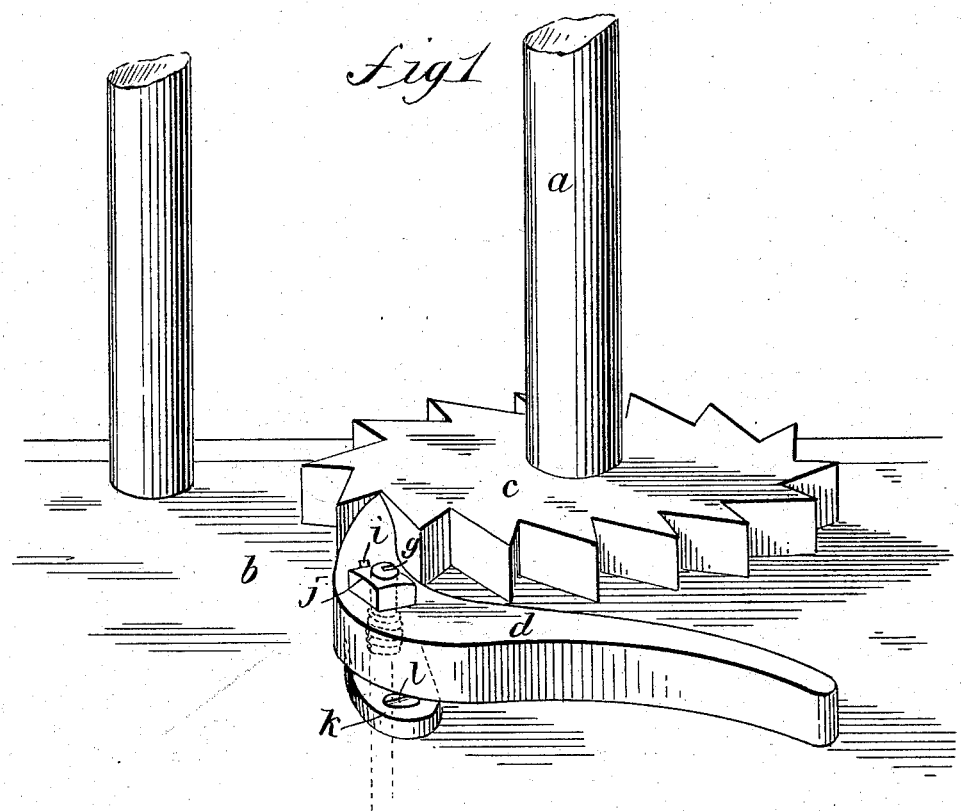
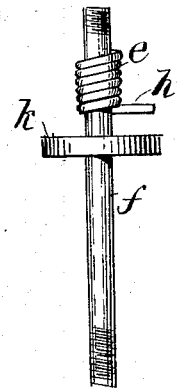
WITNESSES:
INVENTOR:
J. H. Pitard
BY Munn & Co
ATTORNEYS.

UNITED STATES PATENT OFFICE.

JOHN H. PITARD, OF MOBILE, ALABAMA.

CAR-BRAKE.

SPECIFICATION forming part of Letters Patent No. 282,222, dated July 31, 1883.

Application filed June 5, 1883. (No model.)

*To all whom it may concern:*

Be it known that I, JOHN H. PITARD, of Mobile, county of Mobile, Alabama, have invented a new and useful Improvement in Car-Brake Dogs, of which the following is a full, clear, and exact description.

My invention consists of a spring, in combination with the pivot of a car-brake-staff dog, to cause the dog to automatically engage the ratchet-wheel of the staff for locking it when set to hold the brakes on, the spring being contrived in the eye of the dog, through which its pivot-bolt passes, so as to be protected from injury, and also to be concealed from view, the arrangement being simple and cheap, and providing a means for causing the dog to engage quickly and at any time that the staff may be turned to apply the brakes, which will save much trouble to the brakeman, and may be the means of preventing accidents at times when the brakeman is prevented, from any cause, from attending to it quickly, all as hereinafter fully described.

Reference is to be had to the accompanying drawings, forming part of this specification, in which similar letters of reference indicate corresponding parts in both figures.

Figure 1 is a perspective view of part of a car-platform and brake-staff with my improved spring-dog contrivance, and Fig. 2 is a side elevation of the pivot-bolt of the dog and the spring; also of a washer for a pivot-bearing of the dog a little above the surface of the platform.

The staff $a$ of the brake is arranged on the platform $b$, and provided with a ratchet-wheel, $c$, in the usual manner, with which a dog, $d$, is also employed, as in the common way, except that a spring, $e$, is coiled around the pivot-bolt $f$, in the part which extends through the pivot-eye of the dog, one end of which spring is connected to the bolt by dropping down a slot, $g$, in said bolt, and the other end, $h$, is similarly connected with the dog by dropping down the slot $i$ in the dog, and the spring is arranged to have tension when the dog is turned into the position for dropping down to its place on the platform by the side of the ratchet-wheel to thrust the dog into the teeth. A nut, $j$, is screwed down to the shoulder of the screw-threads on the pivot-bolt above the dog to bind fast on the bolt without binding the dog, but so as to keep the dog in its place, and the bolt, which has a washer, $k$, for a pivot-support of the dog, extends down through the platform, and is secured by a nut, key, or other means, as may be preferred, and the washer $k$ may be fixed to the platform $g$ by a screw, $l$.

Having thus described my invention, I claim as new and desire to secure by Letters Patent—

1. A spring, $e$, combined with the dog $d$ and pivot bolt $f$, said spring being coiled around the bolt in the eye of the dog, and connected to the bolt and the dog suitably to thrust the dog into the notches of the ratchet-wheel $c$, substantially as described.

2. The combination of the dog $d$, spring $e$, pivot-bolt $f$, washer $k$, and the nut $j$, said spring being connected to the bolt and the dog, and the nut being screwed down to the shoulder of the screw-thread without binding the dog, substantially as described.

JOHN HARRISON PITARD.

Witnesses:
THOMAS J. BURNS,
EDWARD G. DREAPER.